United States Patent
Szczerba et al.

(10) Patent No.: US 12,528,351 B1
(45) Date of Patent: Jan. 20, 2026

(54) VEHICLE DISPLAY SYSTEMS AND CONTROL LOGIC FOR GENERATING DIGITAL WINDOW STICKERS FOR CONNECTED VEHICLE APPLICATIONS

(71) Applicant: GM GLOBAL TECHNOLOGY OPERATIONS LLC, Detroit, MI (US)

(72) Inventors: Joseph F. Szczerba, Grand Blanc, MI (US); Brittany L. Pletscher, Oakland, MI (US); Danielle A. Cory, Brighton, MI (US); Thomas A Seder, Fraser, MI (US); Kai-Han Chang, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/977,001

(22) Filed: Dec. 11, 2024

(51) Int. Cl.
*B60K 35/22* (2024.01)
*B60K 35/23* (2024.01)
(Continued)

(52) U.S. Cl.
CPC .............. *B60K 35/22* (2024.01); *B60K 35/23* (2024.01); *G06Q 50/10* (2013.01);
(Continued)

(58) Field of Classification Search
CPC .... B60K 35/22; B60K 35/23; B60K 2360/31; B60K 2360/334; B60K 2360/592; G06Q 50/10; G06Q 20/3274; B60Y 2300/18108; G06K 19/06028; G06K 19/06037; G06K 19/06112
See application file for complete search history.

(56) References Cited

U.S. PATENT DOCUMENTS 7,248,151 B2  7/2007  McCall
8,072,686 B2  12/2011 Cui
(Continued)

FOREIGN PATENT DOCUMENTS

CH         714925 A2    10/2019
DE    102013106430 A1    6/2014
(Continued)

*Primary Examiner* — Douglas Wilson
(74) *Attorney, Agent, or Firm* — Quinn IP Law

(57) ABSTRACT

Presented are vehicle display systems for generating digital window stickers that enable connected vehicle applications, methods for making/using such display systems, and vehicles equipped with such display systems. A method of operating a vehicle display system includes a passenger cabin telematics unit receiving a selection from a vehicle occupant to execute a desired transaction with a principal party. Upon receiving the occupant's selection, the telematics unit responsively selects a digital window sticker with a virtual barcode for completing the desired transaction. The telematics unit also responds to receiving the occupant's selection by determining a real-time location of the host vehicle, and determining when the host vehicle has completed a predefined dynamic vehicle action. Upon confirming the vehicle completed the dynamic vehicle action and the vehicle's real-time location is within a predefined proximity to the principal party, the vehicle display system displays the digital window sticker in the occupant side window.

20 Claims, 3 Drawing Sheets

(51) Int. Cl.
*G06Q 20/32* (2012.01)
*G06Q 50/10* (2012.01)
*G06K 19/06* (2006.01)

(52) U.S. Cl.
CPC .... *B60K 2360/31* (2024.01); *B60K 2360/334* (2024.01); *B60K 2360/592* (2024.01); *B60Y 2300/18108* (2013.01); *G06K 19/06028* (2013.01); *G06K 19/06037* (2013.01); *G06K 19/06112* (2013.01); *G06Q 20/3274* (2013.01)

(56) References Cited

U.S. PATENT DOCUMENTS

| | | | |
|---|---|---|---|
| 8,564,502 | B2 | 10/2013 | Cui |
| 8,606,430 | B2 | 12/2013 | Seder |
| 8,633,979 | B2 | 1/2014 | Szczerba |
| 8,692,739 | B2 | 4/2014 | Mathieu |
| 8,823,552 | B1 | 9/2014 | Raphael |
| 9,404,742 | B2 | 8/2016 | Huntzicker |
| 9,684,168 | B2 | 6/2017 | Huntzicker |
| 9,688,287 | B2 | 6/2017 | Seder |
| 2012/0062725 | A1 | 3/2012 | Wampler, II |
| 2018/0253805 | A1* | 9/2018 | Kelly .................... G06Q 50/12 |
| 2019/0025845 | A1* | 1/2019 | Wu .................... G06Q 20/3274 |
| 2019/0146216 | A1* | 5/2019 | Mourou .................... B60J 3/04 280/781 |
| 2022/0366165 | A1* | 11/2022 | Esquivel .............. G06Q 30/018 |
| 2024/0142776 | A1 | 5/2024 | Sharma |

FOREIGN PATENT DOCUMENTS

| | | |
|---|---|---|
| DE | 102014001993 A1 | 11/2014 |
| DE | 102020106844 A1 | 9/2021 |

\* cited by examiner

VEHICLE DISPLAY SYSTEMS AND CONTROL LOGIC FOR GENERATING DIGITAL WINDOW STICKERS FOR CONNECTED VEHICLE APPLICATIONS

INTRODUCTION

The present disclosure relates generally to display systems for motor vehicles. More specifically, aspects of this disclosure relate to in-cabin vehicle display systems for transparent or projection display of digital stickers on vehicle windows.

Current production motor vehicles, such as the modern-day automobile, may be erected with a vehicle body—as either a body-on-frame or a unibody construction—that contains an interior passenger compartment for seating and safeguarding the vehicle occupants. Mounted between the forward A-pillars of the vehicle body is a windshield (or "windscreen" in some countries) that prevents the unwanted ingress of wind, rain, and debris while providing an aerodynamically formed window through which the driver views the roadway. Located underneath the windshield and forward of the driver seat is a dashboard instrument panel (colloquially the "instrument cluster" or "IP") that contains an assortment of digital or electromechanical dials, gauges, meters, and indicators for relaying information about the vehicle to the driver. A vehicle telecommunications and information ("telematics") unit may be inset within the centerstack portion of the dashboard to provide occupants with an onboard computing device that provides a mixture of services, including feedback and control for various in-vehicle subsystems.

To increase driver awareness of vehicle systems operation and ambient driving conditions, some modern vehicles supplement the telematics unit and IP with a head-up display (HUD) system that uses a transparent "see through" display panel for displaying information within the viewing envelope of the windshield. Vehicle HUDs are designed to present information within an operator's forward-driving field of view and, thus, reduce superfluous eye scanning and glance behavior at the instrument panel and center stack. Due to the innate costs and complexities of integrating a separate transparent display panel of an HUD, some vehicles instead use a reflected light emitting diode (LED) alert display (RLAD) to present warnings and notifications to drivers by projecting LED-source light onto an interior surface of the vehicle windshield. While HUD and RLAD systems provide drivers with real-time vehicle system feedback, they are typically unable to display information on other vehicle windows or provide connected vehicle functionality.

SUMMARY

Presented below are vehicle display systems with control logic for generating digital window stickers that enable connected vehicle applications, methods for operating and methods for manufacturing such vehicle display systems, and motor vehicles equipped with such display systems. By way of non-limiting example, a resident vehicle display system employs a transparent display panel or a projection display unit to display a linear, multilayer, or matrix barcode on the driver-side window of a vehicle door assembly. This digital barcode may be specific to the host vehicle or an occupant of the vehicle, and may be automatically presented by the display system when the occupant wishes to procure goods or services from a third-party entity. The vehicle owner, driver, or passenger (collectively "occupant" or "user") may select which of multiple digital barcodes to display using an in-cabin Infotainment Head Unit (IHU) or a dedicated software application ("app") operating on the occupant's handheld smartphone or tablet computer. These user interfaces may also be used to specify when the digital barcode is presented (e.g., by manual selection, based on a geopositional or geofenced location, selected time/dates, etc.) and the manner in which it is displayed (e.g., color, size, format, etc.). The digital barcode may be linked to a personal user account by which the occupant may compensate the third-party entity for the desired goods/services.

Historical user-behavior data and crowd-sourced data may be collected, filtered, and input into a statistical machine learning (ML) algorithm that is trained to predict user behavior that may be used, for example, to generate barcode use options and other system functionality. To ensure heightened security, a digital barcode may be displayed in direct response to a vehicle occupant confirming it is a desired action. Digital barcode display may also be provisioned in response to a preselected vehicle action, such as operation of a gear-shift lever or knob (e.g., driver shifting vehicle into neutral or park) or a vehicle window being lowered a predefined threshold distance (e.g., driver opens driver-side window three-quarters length to facilitate a face-to-face transaction without impeding display of the digital barcode). It may be desirable that all user interactions with the vehicle's digital window sticker feature be executed through the vehicle telematics unit and, thus, not involve operation of a personal smartphone or laptop. An attendant of the third-party entity may scan the digital barcode to complete the desired transaction; the IHU may concomitantly output a visual or audible confirmation message.

Aspects of this disclosure are directed to methods for making and methods for using any of the herein described motor vehicles and vehicle side-window display systems. In an example, a method is presented for operating a vehicle display system of a subject "host" vehicle. The host vehicle has a vehicle body with passenger cabin, a front windshield, and multiple occupant side windows. This representative method includes, in any order and in any combination with any of the above and below disclosed options and features: receiving, e.g., via a touchscreen display panel, microphone, or other user input device of a telematics unit located inside the passenger cabin, a selection from a vehicle occupant to execute a desired transaction with a principal party; selecting, e.g., via the telematics unit responsive to receiving the occupant's selection, a digital window sticker that contains a virtual barcode created for completing the desired transaction; retrieving, e.g., via the telematics unit from a geo-location device responsive to receiving the occupant's selection, location data indicative of a real-time location of the host vehicle; determining, e.g., via the telematics unit responsive to receiving the occupant's selection, when the host vehicle has completed one or more predefined dynamic vehicle actions; and displaying, e.g., via the vehicle display system responsive to the host vehicle completing the dynamic vehicle action(s) and the vehicle's real-time location being within a predefined proximity to the principal party, the digital window sticker in the occupant side window.

Aspects of this disclosure are also directed to computer-readable media (CRM) containing controller-executable instructions for provisioning digital window stickers for executing connected vehicle applications. In an example, a non-transient CRM stores instructions that are executable by a resident controller of an in-vehicle telematics unit. These CRM-stored instructions, when executed by the resident controller, cause the telematics unit to perform operations, including: receiving, via a user input device of the telematics unit, a user selection from a vehicle occupant to execute a desired transaction with a principal party; selecting, responsive to receiving the user selection, a digital window sticker containing a virtual barcode adapted to complete the desired transaction; retrieving, responsive to receiving the user selection, location data indicative of a real-time vehicle location of the motor vehicle; determining, responsive to receiving the user selection, when the motor vehicle has completed a predefined dynamic vehicle action; and commanding, responsive to the motor vehicle completing the predefined dynamic vehicle action and the real-time vehicle location being within a predefined proximity to the principal party's real-time location, the vehicle display system to display the digital window sticker in the occupant side window.

Additional aspects of this disclosure are directed to motor vehicles equipped with in-vehicle display systems for generating digital window stickers that enable connected vehicle applications. As used herein, the terms "vehicle" and "motor vehicle" may be used interchangeably and synonymously to include any relevant vehicle platform, such as passenger vehicles, commercial vehicles, industrial vehicles, tracked vehicles, farm equipment, aircraft, watercraft, etc. In an example, a motor vehicle includes a vehicle body with a passenger cabin, multiple road wheels attached to the vehicle body (e.g., via corner modules coupled to a unibody or body-on-frame chassis), and other standard original equipment. A prime mover, which may be in the nature of an electric traction motor and/or an internal combustion engine (ICE) assembly, is located inside the vehicle body and drives the road wheel(s) to propel the vehicle. The vehicle may also include a front windshield spanning across a forward end of the passenger cabin, and a driver-side vehicle door assembly with an occupant side window located laterally outboard from the driver seat.

Continuing with the discussion of the foregoing example, the vehicle is also equipped with a vehicle display system that is mounted inside the passenger cabin and includes a transparent display panel or a projection display unit that face the driver-side occupant window. Also located inside the passenger cabin is a telematics unit that is programmed to receive a selection from a vehicle occupant to execute a desired transaction with a principal party (e.g., purchase a product or service from a retail entity). Upon receipt of the occupant's selection, the telematics unit responsively selects a digital window sticker that contains a virtual barcode designed to complete the desired transaction. The telematics unit also responds to receiving the occupant selection by retrieving location data indicative of the vehicle's real-time location, and determining when the motor vehicle has completed one or more predefined dynamic vehicle actions. Upon confirming that the motor vehicle completed a predefined dynamic vehicle action and the vehicle's real-time location is within a predefined proximity to the principal party, the telematics unit commands the in-vehicle display system to display the digital window sticker in the occupant side window.

For any of the disclosed vehicles, systems, and methods, the predefined dynamic vehicle action may include decelerating the vehicle, changing an operating mode of the vehicle's powertrain, and/or moving the position of the occupant side window. By way of example, changing the operating mode of the vehicle powertrain may include shifting the vehicle into park or neutral or keying-off the vehicle. Moving the window position may include lowering the window to or past a predefined threshold position. Decelerating the vehicle, on the other hand, may include bringing the vehicle to a complete stop. As another option, selecting a digital window sticker may include generating a digital sticker and associated virtual barcode in real-time with the virtual barcode customized to the vehicle occupant and/or the desired transaction. Alternatively, selecting a digital window sticker may include accessing a resident or remote memory device to retrieve therefrom a virtual barcode that is linked to a personal user account of the vehicle occupant.

For any of the disclosed vehicles, systems, and methods, the vehicle display system may include a transparent display panel (e.g., micro LED, OLED or EL transparent display panel) that faces the occupant side window and displays therethrough the digital window sticker. Alternatively, the vehicle display system may include a projection display unit (e.g., miniature pico or hologram projector and window-mounted projection film) that faces the occupant side window and projects the digital window sticker onto the window. As another option, the telematics unit may respond to receiving a user selection by outputting (e.g., via touchscreen display or audio component) a user-selectable "window sticker" option to use a digital sticker to complete the desired transaction. Upon receipt of a vehicle occupant's selection of this option (e.g., by pressing a soft button on the telematics touchscreen or making a verbal selection using an in-cabin microphone), the telematics unit may concomitantly select the digital window sticker. The telematics unit may also respond to the vehicle's real-time location being within a predefined proximity to the principal party's real-time location by outputting a user-selectable "complete transaction" option; if the vehicle occupant selects this option (e.g., via manual, audible, or visual user input), the telematics unit may respond by displaying the digital window sticker in the occupant side window.

For any of the disclosed vehicles, systems, and methods, the vehicle's real-time location is deemed to be within the predefined proximity to the principal party's real-time location when the vehicle location breaches a virtual geofence, e.g., that delineates a geographic perimeter of a building or storefront of the principal party. Alternatively, the predefined proximity may be a fixed location of a parking lot, a kiosk, a storefront, an entryway, a drive-thru window, etc. As another option, the telematics unit may first authenticate a user identity of the vehicle occupant and, once verified, responsively display one or more user-selectable options to execute one or more transactions with one or more principal parties. After displaying the digital window sticker, the telematics unit may receive a wireless notification confirming the virtual barcode was scanned by an attendant of the principal party. In this instance, the telematics unit may responsively output a visual, haptic, or audible confirmation alert to the vehicle occupant denoting the desired transaction was approved/completed.

For any of the disclosed vehicles, systems, and methods, the host vehicle may also receive historical data of vehicle occupant behavior and/or crowd-sourced data of third-party participant behavior and, if desired, aggregate and preprocess (e.g., clean, filter, discretize, reformat, etc.) the received data. This data is then input into a trained ML model to predict vehicle occupant behavior, such as which virtual barcode to select for a particular transaction, how to display a digital window sticker, and/or when to display a digital window sticker. As a further option, a vehicle occupant may enter one or more user-selectable settings to set one or more system settings that designate when to display the digital window sticker. In this instance, display of the digital window sticker is restricted, at least in part, based on the one or more occupant-selected system settings.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
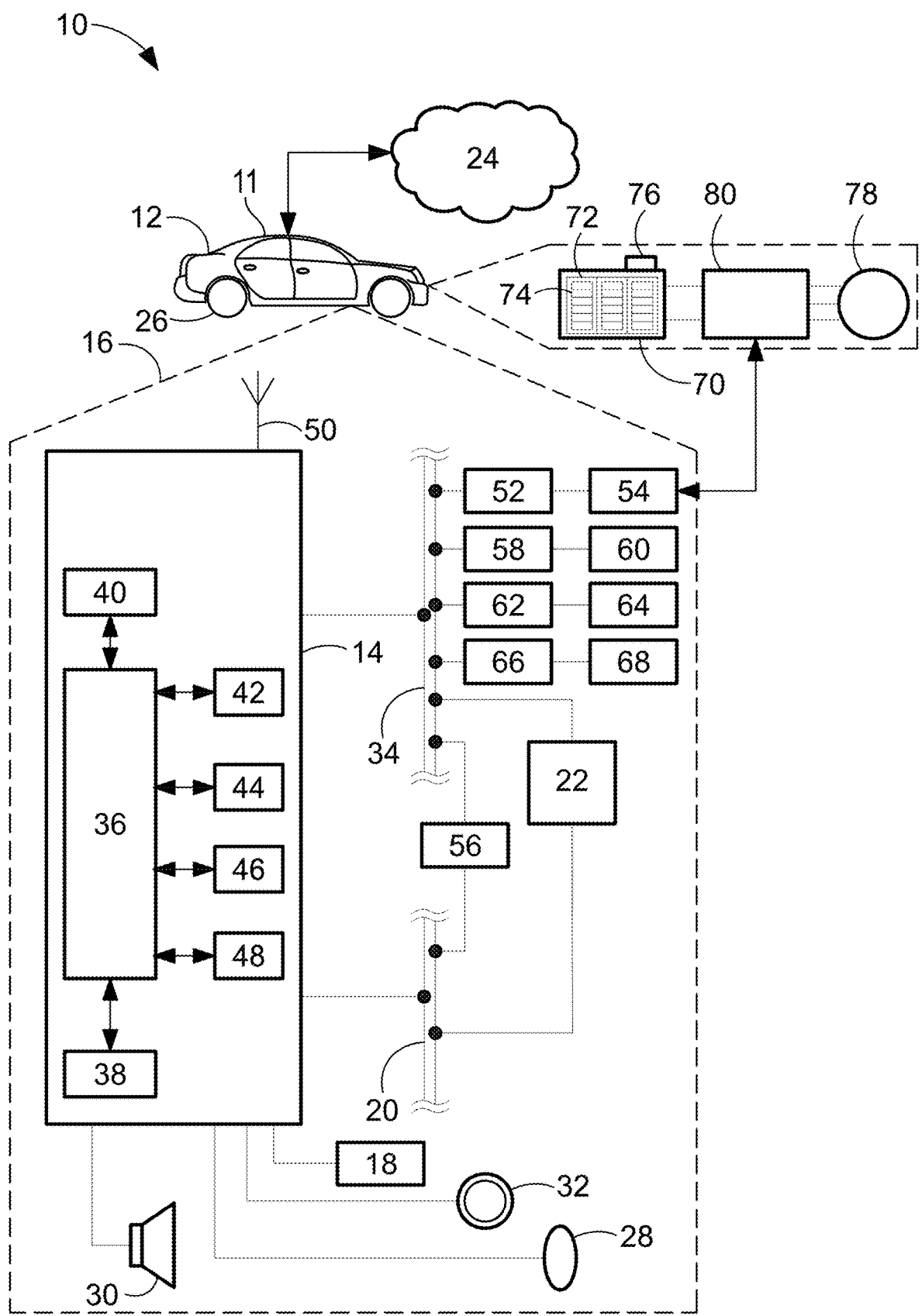
FIG. 1 is a partially schematic, side-view illustration of a representative motor vehicle with a resident vehicle display system and a network of in-vehicle controllers, user-interface devices, and communication devices for provisioning digital window stickers to execute connected vehicle applications in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short-is merely an exemplary application with which aspects of this disclosure may be practiced. In the same vein, utilization of the present concepts for displaying digital window stickers through a driver-side window of a vehicle door assembly should be appreciated as a non-limiting implementation of disclosed features. As such, it will be understood that aspects of this disclosure may be effected to dynamically display information through other vehicle windows (e.g., front windshield, rear windows and back glass, passenger-side windows, etc.), implemented to display other digital information (e.g., driver ID, vehicle VIN, parking pass, entrance pass, etc.), and utilized for any logically relevant type of motor vehicle. Moreover, only select components of the motor vehicle and vehicle display system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14—also referred to herein as Infotainment Head Unit (IHU)—that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, switches, touchpads, facial recognition device, touchscreen, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated of the telematics unit 14 or may be part of an in-cabin audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, an Infotainment Control Module (ICM) 56, a Body Control Module (BCM) 58, a Sensor System Interface Module (SSIM) 60, and assorted other vehicle ECUs, such as a transmission control module (TCM), engine control module (ECM), Brake System Control Module (BSCM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), a wireless modem, or a mobile hotspot, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The vehicle speed sensor(s) 66 may be in the nature of a mechanical or electromagnetic transmission shaft sensor or electronic wheel speed sensor for detecting vehicle speed. The vehicle dynamics sensor(s) 68 may be in the nature of a single-axis or a triple-axis accelerometer, an angular rate sensor, an inclinometer, steering wheel angle sensor, brake sensor, etc. The type, placement, number, and interoperability of the distributed array of in-vehicle sensors may be adapted, singly or collectively, to a given vehicle platform for achieving a desired level of automated vehicle operation.

To propel the automobile 10, a vehicle powertrain is operable to generate and deliver tractive torque to one or more of the vehicle's drive wheels 26. The powertrain is represented in FIG. 1 by an electric traction motor (M) 78 that is operatively connected to a rechargeable energy storage system (RESS), which may be in the nature of a chassis-mounted traction battery pack 70. The traction battery pack 70 is generally composed of one or more battery modules 72 each containing a cluster of battery cells 74, such as lithium-class, zinc-class, nickel-class, or organosilicon-class cells of the pouch, prismatic, or cylindrical type. One or more prime movers, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

During operation of the motor vehicle 10, a vehicle occupant—be it the driver, owner, passenger, etc.—may wish to complete a transaction with another (principal) party outside of the vehicle 10. For instance, an occupant may desire to purchase a product or service from a retail entity, access a state/national/theme park, enter a secure parking structure, pay a toll, etc. Rather than require the occupant to use their smartphone or personal wallet/purse to complete the transaction, there are disclosed herein vehicle display systems with control logic for generating digital window stickers that facilitate completion of the transaction via a connected vehicle application. Using the in-cabin IHU/telematics unit 14 of FIG. 1, for example, a vehicle occupant may authenticate their identity, navigate through the IHU to locate and select a desired transaction, and then choose to use a window-displayed digital sticker with a virtual barcode to complete the transaction.

Upon arrival at the principal party's location (e.g., parking lot, drive-thru window, kiosk, storefront, entryway security booth, etc.), the digital window sticker with the machine-readable code is displayed through one of the vehicle's windows for easy accessibility by an attendant or automated barcode scanner associated with the principal party. The vehicle display system may employ a small, light-weight pico projector, a miniature hologram projector, a micro light-emitting diode (LED) display, a transparent organic light-emitting diode (OLED) panel, an electroluminescent (EL) transparent display, or a miniature flat panel display unit to display the digital sticker with virtual barcode in the vehicle window. Third-party integration may allow for existing retailer codes to be passed to the vehicle manufacturer's system for subsequent display in a subject "host"

vehicle's window. To ensure Payment Card Industry Data Security Standard (PCI DSS) compliance, virtual barcode display may necessitate occupant authentication and approval. Additional security may be provided by also restricting display of the virtual barcode until the host vehicle first arrives at a designated location associated with principal party, the vehicle comes to a stop, and the driver-side window is rolled down (e.g., at least ¾ of the way) to allow for human interaction.

A digital window sticker with connected application control may leverage transparent/projector display technology to dynamically display a standard linear barcode, a two-dimensional (2D) barcode, or a matrix-type quick-response (QR) code in an occupant side window of a vehicle. This user-specific code may be presented in accordance with occupant-stipulated settings to secure goods and services. For some system configurations, an occupant may be provided with the option to choose which code to display (e.g., using a mobile application or IHU application). Moreover, an occupant may also determine when the code should be presented, for example, based on a geofenced location, proximity to a retailer's location, specified times/dates, or by manual selection. The display system may utilize a trained machine learning (ML) algorithm to forecast customer behavior, for example, to present payment options when approaching specific locations or at times when payments are usually made. Virtual barcode display may be limited to when the occupant confirms it is the desired action to ensure heightened security. Prior to a code being displayed, the host vehicle may require the occupant's side window first be rolled down to facilitate a face-to-face transaction while still allowing display of the code. Once the principal party scans the code and completes the transaction, the IHU/telematics unit 14 may display a confirmation message and the party may then deliver the goods or services.

Figure 2:
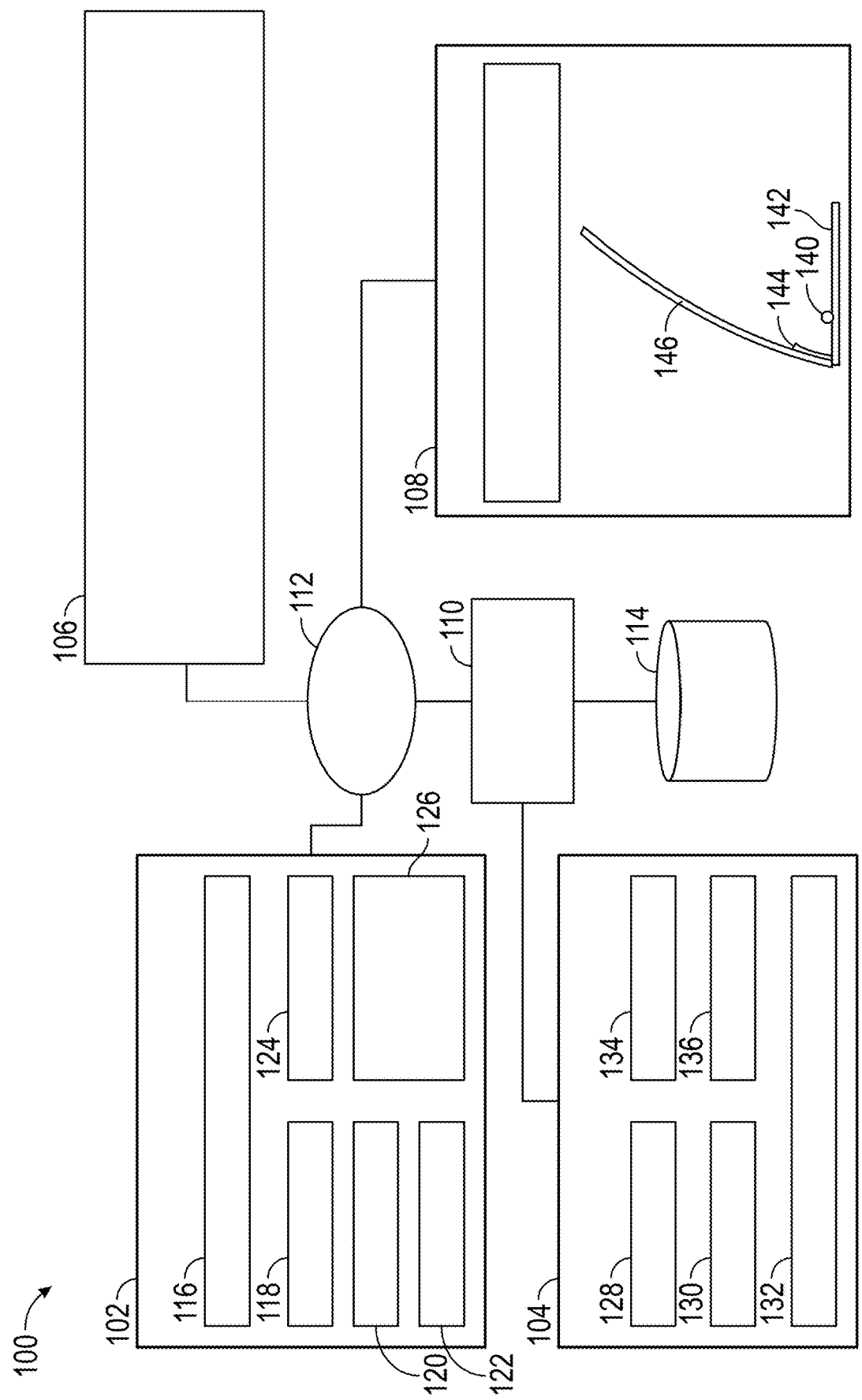
FIG. 2 is a diagrammatic illustration of a representative vehicle display system for generating digital window stickers in accordance with aspects of the present disclosure.

FIG. 2 presents an example of a resident vehicle display system 100 that may be integrated into a motor vehicle, such as automobile 10 of FIG. 1, for generating a digital window sticker that is designed to help effect a desired transaction through a connected vehicle application. Vehicle display system 100 of FIG. 2 may be delineated into four primary components: an On-Board Inputs module 102, an Off-Board Inputs module 104, a Trained ML Model module 106, and a System Output module 108. These four interoperable control modules may be communicatively connected to one another and to a central on-board computer 112, such as in-cabin IHU/telematics unit 14 of FIG. 1, by a data and communication network 110, such as network connection interface 34. As used herein, the term "module" may be defined to include any hardware, software, firmware, processing logic, and/or processor device, individually or in any combination, which may discretized into individual integrated circuit (IC) devices or embedded as software modules within an existing network controller and saved to a resident storage device, such as memory device 38 of FIG. 1, or an off-board data server 114, such as cloud host service 24 database. It should be appreciated that the vehicle display system 100 may include greater or fewer control modules than that which are shown, including combining or segregating the illustrated modules 102, 104, 106 and 108.

On-Board Inputs module 102 contains a set of software application subroutines that may be executed to provision digital window sticker functionality, including a Virtual Sticker Application 116 by which a user may interface with and control select aspects of the vehicle display system 100 and presentment of digital window content. A Facial Recognition Application 118 enables a user to enter hands-free inputs using facial expressions and eye movement, and a Navigation Application 120 provides real-time geolocation tracking of the host vehicle using, for example, GPS, cellular trilateration, or V2X data exchanges. A Mobile Device Application 122 enables system pairing and communication with a vehicle occupant's personal computing device, and a Cabin Monitoring Application 124 enables system tracking of occupant presence, location, and individualized occupant-specific characteristics (driver ID, defaults, preferences, etc.). A Vehicle Infotainment System 126 application enables system integration and interoperability with a vehicle IHU/telematics unit.

Similar to On-Board Inputs module 102, Off-Board Inputs module 104 contains a distinct set of software application subroutines that may be executed to provision herein-described digital sticker functionality. By way of non-limiting example, an Internet Interface Application 128 acts as connectivity gateway for data exchanges with the World Wide Web (WWW), whereas a Cellular Interface Application 130 acts as a resident cellular connection point for managing data flow with a cellular tower network. Cloud Wallet Payment Application 132 enables the system 100 to securely access and retrieve stored payment information from a user's digital wallet, whereas GPS Application 134 and V2X application 136 respectively enable routine broadcast data exchanges with a GPS-based geolocation system and a V2X vehicle communications system.

With continuing reference to FIG. 2, a Trained ML Model module 106, which may be embodied as a trained Deep Neural Network (DNN) predictive analytics platform, may be employed to evaluate user data, identify patterns within the data, derive trends from these patterns, and leverage these insights to forecast future user behavior. For instance, the ML module 106 algorithm may determine: (1) which virtual code to display for a given transaction; (2) when to display a virtual code (day, date, time, etc.); (3) where to display a virtual code (location, destination, geofence, context, etc.); and/or (4) user-specific characteristics (e.g., driver, passenger, use preferences, use restrictions, appointment calendar, etc.). In a non-limiting example, the ML module 106 may collect historical data of vehicle occupant behavior and/or crowd-sourced data of third-party participant behavior. If desired, the collected data may be aggregated then cleaned, filtered, discretized, reformatted, or otherwise "preprocessed", and then stored in cache memory. The trained ML model algorithm evaluates the preprocessed data to derive one or more predicted user behaviors of a vehicle occupant, including which virtual barcode to select for that occupant and/or when to display a digital window sticker containing that virtual barcode for a particular transaction desired by that occupant.

Using the on-board inputs, off-board inputs, and ML-generated predictions provided by control modules 102, 104, and 106, the central on-board computer 112 of vehicle display system 100 coordinates with System Output module 108 of FIG. 2 to display a digital object containing a machine-readable code in a vehicle window. In accord with the illustrated example, a miniature pico projector 140 is shown mounted on top of or, if desired, embedded within a dashboard instrument panel (IP) fascia 142 that is located at a forward end of a vehicle passenger compartment, such as passenger cabin 11 of FIG. 1. A polymeric projection film 144, which may be in the nature of a rigid plate, flexible panel, or thin film fabricated from a suitable optical diffuser, transparent phosphor, or clear holographic material, may be laminated to or mounted immediately adjacent an occupant side window 146. System Output module 108 may selectively activate the pico projector 140 to optically project an enlarged image of a digital window sticker onto the projection film 144 such that a QR code embedded within the window sticker is visible through the occupant side window 146.

Figure 3:
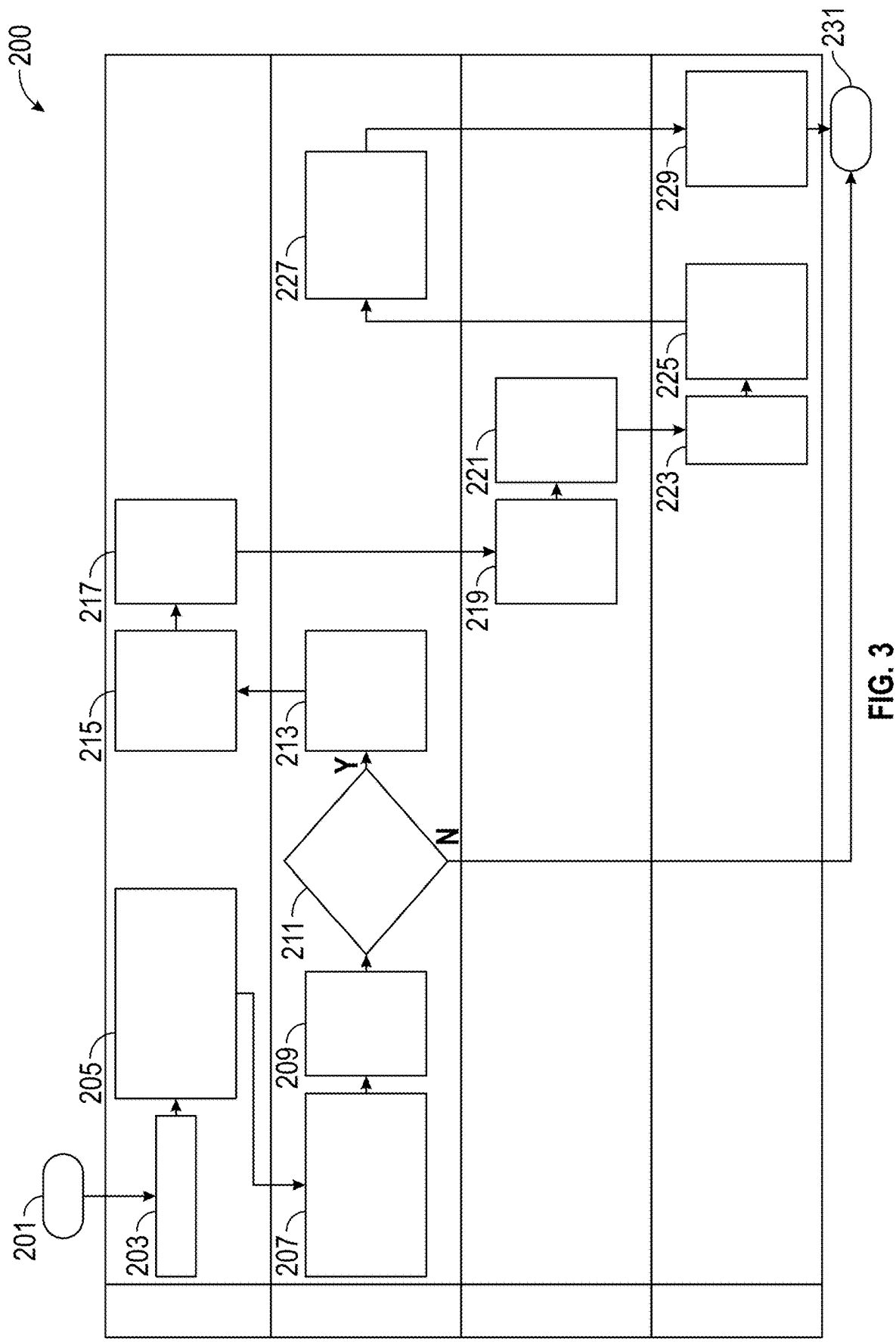
FIG. 3 is a flowchart illustrating a representative vehicle display system control protocol for generating digital window stickers for connected vehicle applications, which may correspond to non-transient, memory-stored instructions that are executable by a resident or remote microprocessor, control module, logic circuit, central controller, or other integrated circuit (IC) device or network of circuits/modules/microprocessors/controllers/devices (collectively "controller") in accordance with aspects of the disclosed concepts.

With reference next to the flowchart of FIG. 3, an improved method or control protocol for operating a resident vehicle display system, such as in-cabin window display system 100 of FIG. 2, of a motor vehicle, such as automobile 10 of FIG. 1, is generally described at 200 in accordance with aspects of the present disclosure. Some or all of the operations illustrated in FIG. 3 and described in further detail below may be representative of an algorithm that corresponds to non-transitory, processor-executable instructions that may be stored, for example, in main or auxiliary or remote memory (e.g., resident vehicle memory device(s) 38 and/or remote cloud host service 24 database of FIG. 1). These instructions may be executed, for example, by a microprocessor, central controller, dedicated control module, programmable logic circuit, or other module or device or network of controllers/modules/devices (e.g., vehicle CPU 36 and/or back-office (BO) server-class computer terminal of cloud host service 24) to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 3 with memory-stored, computer-readable instructions for initializing a digital window sticker control protocol for a motor vehicle. This routine may be initialized in real-time, near real-time, continuously, systematically, sporadically, and/or at predefined time intervals, for example, each 10 or 100 milliseconds during operation of the motor vehicle 10. As yet another option, terminal block 201 may initialize responsive to a user command prompt (e.g., via telematics input controls 28, 32), a resident vehicle controller prompt (e.g., from CPU 36), or a broadcast prompt signal received from a centralized BO vehicle services system (e.g., from cloud host service 24). In one example, the method 200 may automatically initialize responsive to a key-on event in which a driver of the vehicle 10 depresses a start ignition button or the driver presses a corresponding soft key on the touchscreen of telematics unit 14. Upon completion of some or all of the control operations presented in FIG. 3, method 200 may advance to END terminal block 231 and temporarily terminate or, optionally, may loop back to terminal block 201 and run in a continuous loop (e.g., until the vehicle 10 is shifted back into park (P) and keyed-off).

From terminal block 201, method 200 advances to USER AUTHENTICATION data input block 203 to ascertain a user's identity and verify that their identity is authorized to utilize a connected vehicle application to conduct a desired transaction (e.g., after entry of a unique ID and a distinct personal password). It is envisioned that a vehicle driver may be preauthorized by the host vehicle to conduct a transaction without requiring that the driver manually enter their personal identification information, for example, by validating a handheld key fob borne by the driver or through biometric facial or speech recognition. For at least some system implementations, user authentication may be a prerequisite to displaying or enabling user-selectable options for executing desired transactions through connected vehicle applications. Upon completion of an initial user preauthorization protocol, a vehicle occupant may navigate to an application settings menu, e.g., using the input controls 32 of telematics unit 14 of FIG. 1. Through this menu, the occupant may activate, deactivate, or modify one or more user-selectable system settings, which may include designating what, when, where, and how to display a digital window sticker.

Method 200 proceeds to TRANSACTION MENU display block 205 and presents one or more user-selectable transaction options to a vehicle occupant. By way of example, and not limitation, a driver of automobile 10 of FIG. 1 may use the telematics unit 14 touchscreen to navigate to a desired IHU connected vehicle application. When selected, this IHU application may present the driver with assorted options for purchasing goods or services from a retail entity, as indicated at TRANSACTION SELECTION display block 207. At this juncture, the driver may employ any of the herein-described user-input devices to select one or more available transaction options (e.g., take-out food order or carwash) with the associated principal party (e.g., restaurant chain or retail carwash).

After receiving an occupant's selection to execute a desired transaction with a designated principal party, method 200 may respond by presenting the user with a variety of different options for completing the transaction. According to one example, method 200 may execute DIGITAL WALLET database block 209 and access a locally stored or remotely secured personal digital wallet of the vehicle occupant. Telematics unit 14 concomitantly retrieves select contents of the digital wallet and displays them to the occupant along with an option to choose one of the available payment methods stored by their digital wallet. After receiving the user's selection, method 200 advances to DIGITAL STICKER decision block 211 to determine whether or not the occupant wishes to use a window-displayed virtual code to facilitate completing the desired transaction. Telematics unit 14 of FIG. 1, for example, may display a user-selectable soft key to USE WINDOW STICKER to pay for the desired transaction; the driver may employ one of the telematics unit's 14 user input controls 32 to manually or audibly select this option.

In response to receiving the occupant's selection of the USE WINDOW STICKER option, method 200 automatically executes VIRTUAL CODE GENERATION subroutine 213 and selects a digital window sticker that contains a virtual barcode that is designed to facilitate completion of the desired transaction. For some transactions, the telematics CPU 36 may generate a digital sticker and associated virtual barcode in real-time, with the resultant virtual barcode customized to the vehicle occupant (e.g., QR code directly linked to payment account in digital wallet) and/or the occupant's desired transaction (e.g., QR code created to pay specific amount to specific retail entity). Alternatively, the telematics CPU 36 may access resident memory devices 38 to retrieve therefrom a virtual barcode that is linked to a personal user account of the vehicle occupant (e.g., linear barcode linked to vehicle-stored payment device). It is also envisioned that the telematics unit 14 may solicit the corresponding IHU vehicle application to issue a machine-readable code for completing the occupant's desired transaction; the issued code will then be embedded within a digital sticker for display in one of the host vehicle's passenger cabin windows.

With continuing reference to FIG. 3, method 200 proceeds to VEHICLE TRACKING data input block 215 to actively monitor the movement of the host vehicle in order to determine if and when the host vehicle arrives at the principal party's place of business. Continuing with the example of FIG. 1, telematics unit 14 may respond to receiving an occupant's selection of a desired transaction by prompting the vehicle's resident LRC device 44 to return location data that is indicative of the host vehicle's real-time location. Using the received vehicle location data, telematics unit 14 determines whether or not the vehicle's real-time location is within a predefined proximity to the principal party's real-time location. A vehicle's real-time location may be deemed to be within a stipulated proximity to the principal party's real-time location when the vehicle location breaches a virtual geofence that delineates a geographic perimeter of a building or storefront of the principal party. Alternatively, the predefined proximity may be designated as a fixed, physical location, such as a parking lot, a kiosk, a storefront, an entryway, a drive-thru window, etc., of the principal party.

Upon concluding that the host vehicle's real-time location is within a predefined proximity to the principal party's real-time location, method 200 may respond by executing COMPLETE TRANSACTION data input block 217 and soliciting the vehicle occupant to confirm that they now wish to complete the desired transaction. For instance, centerstack telematics unit 14 may display a user-selectable PAY NOW soft key option that the driver may select to complete the desired transaction upon arrival at a drive-through window of the principal party's brick-and-mortar store. At this juncture, the driver may select the complete transaction option using the telematics unit's 14 microphone 28 or touchscreen display input device 32. For at least some system implementations, initiating the final steps to complete a desired transaction may be automated by the telematics unit 14 and, thus, data input block 217 may be altogether omitted from the method 200.

Method 200 thereafter advances to DYNAMIC VEHICLE ACTION subroutine 219 to determine if and when the motor vehicle has completed one or more predefined dynamic vehicle actions that are set as preconditions to displaying the digital window sticker. Centerstack telematics unit 14 may communicate with the PCM 52, BCM 58 and SSIM 60 to determine whether or not: (1) a real-time vehicle speed of the host vehicle has been decelerated to below a threshold allowable speed; (2) a current operating mode of the host vehicle's powertrain has been changed to one of a set of predefined allowable modes; and/or (3) a window position of an occupant side window been moved to a predefined window position. By way of example, decelerating the vehicle may include bringing the vehicle to a complete stop (i.e., real-time vehicle speed=~0 mph). Changing the operating mode of the vehicle powertrain, on the other hand, may include shifting the vehicle into park or neutral (i.e., PRNDL lever moved to Park (P) or Neutral (N)) or deactivating the powertrain (e.g., keying-off the vehicle). Moving the window position may include lowering the occupant side window to or past a predefined threshold position (e.g., at least ¾ of the way down).

Upon confirming that the motor vehicle has arrived at the principal party's location and completed the predefined dynamic vehicle action(s), method 200 may responsively execute CODE DISPLAY process block 221 and display the digital window sticker with the virtual barcode in the occupant side window. As noted above, a resident vehicle display system, such as in-cabin window display system 100 of FIG. 2, may employ a transparent display panel or a projection display unit to project the digital window sticker onto or through the occupant side window or a polymeric projection film mounted to the occupant side window. Once displayed, an attendant or automated barcode scanner associated with the principal party may scan the virtual bar code, as indicated at SCAN CODE process block 223. Method 200 thereafter proceeds to PROCESS TRANSACTION subroutine 225 and performs the final steps for completing the transaction (e.g., processing payment, issuing physical receipt, etc.)

After displaying the digital window sticker and processing the transaction, method 200 executes TRANSACTION CONFIRMATION data output block 227 to present the vehicle occupant with verification that the desired transaction was processed and approved. For instance, the telematics unit 14 may receive a wireless notification from a payment process engine of the principal party confirming that the virtual barcode was scanned and the payment for the desired transaction approved. Upon receipt of this notification, the telematics unit 14 may display or announce a confirmation alert denoting the desired transaction was approved. Any desired goods/services associated with the desired transaction are delivered at COMPLETE TRANSACTION process block 229. Method 200 may thereafter advance to END terminal block 231 and temporarily terminate or, optionally, may loop back to terminal block 201 and run in a continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a vehicle display system of a motor vehicle, the motor vehicle having a passenger cabin with an occupant side window, the method comprising:
   receiving, via a user input device of a telematics unit located in the passenger cabin, a user selection from a vehicle occupant to execute a desired transaction with a principal party;
   selecting, via the telematics unit responsive to receiving the user selection, a digital window sticker containing a virtual barcode adapted to complete the desired transaction;
   retrieving, via the telematics unit responsive to receiving the user selection, location data indicative of a real-time vehicle location of the motor vehicle;
   determining, via the telematics unit responsive to receiving the user selection, when the motor vehicle has completed a predefined dynamic vehicle action; and
   displaying, via the vehicle display system responsive to the motor vehicle completing the predefined dynamic vehicle action and the real-time vehicle location being within a predefined proximity to the principal party, the digital window sticker in the occupant side window.

2. The method of claim 1, wherein the predefined dynamic vehicle action includes decelerating the motor vehicle, changing an operating mode of a vehicle powertrain of the motor vehicle, and/or moving a window position of the occupant side window.

3. The method of claim 2, wherein changing the operating mode of the vehicle powertrain includes shifting the vehicle powertrain into park or neutral, and wherein moving the window position includes lowering the window to or past a threshold position.

4. The method of claim 1, wherein selecting the digital window sticker includes generating the virtual barcode in real-time with the virtual barcode customized to the vehicle occupant and/or the desired transaction.

5. The method of claim 1, wherein selecting the digital window sticker includes retrieving the virtual barcode from a resident or remote memory device, the virtual barcode being linked to a personal user account of the vehicle occupant.

6. The method of claim 1, wherein the vehicle display system includes a transparent display panel facing and displaying the digital window sticker through the occupant side window, or a projection display unit facing and projecting the digital window sticker onto the occupant side window or a polymeric projection film mounted to the occupant side window.

7. The method of claim 1, further comprising:
   outputting, via an output device of the telematics unit responsive to receiving the user selection, a user-selectable window sticker option to use a digital sticker; and
   receiving, via the user input device of the telematics unit, selection of the user-selectable window sticker option by the vehicle occupant, wherein selecting the digital window sticker is further in response to the vehicle occupant selecting the user-selectable window sticker option.

8. The method of claim 7, further comprising:
   outputting, via the output device of the telematics unit responsive to the real-time vehicle location being within the predefined proximity to the principal party, a user-selectable complete transaction option; and
   receiving, via the user input device of the telematics unit, selection of the user-selectable complete transaction option by the vehicle occupant, wherein displaying the digital window sticker in the occupant side window is further in response to the vehicle occupant selecting the user-selectable complete transaction option.

9. The method of claim 1, further comprising determining, via the telematics unit responsive to receiving the user selection, the real-time vehicle location is within the predefined proximity to the principal party when the real-time vehicle location breaches a virtual geofence.

10. The method of claim 1, further comprising:
    authenticating, via the telematics unit, a user identity of the vehicle occupant; and
    displaying, via a touchscreen display panel of the telematics unit responsive to authenticating the user identity of the vehicle occupant, a user-selectable option to execute the desired transaction with the principal party.

11. The method of claim 1, further comprising:
    receiving, via the telematics unit after displaying the digital window sticker, a wireless notification confirming the virtual barcode was scanned by an attendant of the principal party; and
    displaying, via the telematics unit responsive to receiving the wireless notification, a confirmation alert denoting the desired transaction was approved.

12. The method of claim 1, further comprising:
    receiving historical behavior data of the vehicle occupant and/or crowd-sourced data of third-party participants; and
    generating, via a trained machine learning (ML) model using the historical behavior data and/or the crowd-sourced data, a predicted user behavior of the vehicle occupant including which virtual barcode to select and/or when to display the digital window sticker.

13. The method of claim 1, further comprising receiving, via the user input device of the telematics unit, a user-selectable setting input from the vehicle occupant selecting a system setting designating when to display the digital window sticker, wherein displaying the digital window sticker is based on the selected system setting.

14. A non-transient, computer-readable medium storing instructions executable by one or more controllers of a telematics unit of a motor vehicle, the motor vehicle including a passenger cabin with an occupant side window, the instructions, when executed by at least one of the one or more controllers, causing the telematics unit to perform operations comprising:

receiving, via a user input device of the telematics unit, a user selection from a vehicle occupant to execute a desired transaction with a principal party;

selecting, responsive to receiving the user selection, a digital window sticker containing a virtual barcode adapted to complete the desired transaction;

retrieving, responsive to receiving the user selection, location data indicative of a real-time vehicle location of the motor vehicle;

determining, responsive to receiving the user selection, when the motor vehicle has completed a predefined dynamic vehicle action; and commanding, responsive to the motor vehicle completing the predefined dynamic vehicle action and the real-time vehicle location being within a predefined proximity to the principal party, a vehicle display system to display the digital window sticker in the occupant side window.

15. A motor vehicle, comprising:

a vehicle body including a passenger cabin with an occupant side window;

a plurality of road wheels attached to the vehicle body;

a prime mover attached to the vehicle body and configured to drive one or more of the road wheels to thereby propel the motor vehicle;

a vehicle display system mounted inside the passenger cabin and including a transparent display panel or a projection display unit each facing the occupant side window; and a telematics unit located in the passenger cabin and configured to:

receive, via a user input device of the telematics unit, a user selection from a vehicle occupant to execute a desired transaction with a principal party;

responsive to receiving the user selection, select a digital window sticker containing a virtual barcode adapted to complete the desired transaction;

responsive to receiving the user selection, retrieve location data indicative of a real-time vehicle location of the motor vehicle;

responsive to receiving the user selection, determine when the motor vehicle has completed a predefined dynamic vehicle action; and responsive to the motor vehicle completing the predefined dynamic vehicle action and the real-time vehicle location being within a predefined proximity to the principal party, command the vehicle display system to display the digital window sticker in the occupant side window.

16. The motor vehicle of claim 15, wherein the predefined dynamic vehicle action includes decelerating the motor vehicle, changing an operating mode of a vehicle powertrain of the motor vehicle, and/or moving a window position of the occupant side window.

17. The motor vehicle of claim 16, wherein changing the operating mode of the vehicle powertrain includes shifting the vehicle powertrain into park or neutral, and wherein moving the window position includes lowering the window to or past a threshold position.

18. The motor vehicle of claim 15, wherein selecting the digital window sticker includes generating the virtual barcode in real-time with the virtual barcode customized to the vehicle occupant and/or the desired transaction.

19. The motor vehicle of claim 15, wherein the telematics unit is further configured to:

output, responsive to receiving the user selection, a user-selectable window sticker option to use a digital sticker; and receive selection of the user-selectable window sticker option by the vehicle occupant, wherein selecting the digital window sticker is further in response to the vehicle occupant selecting the user-selectable window sticker option.

20. The motor vehicle of claim 15, wherein the telematics unit is further configured to determine, after receiving the user selection, the real-time vehicle location is within the predefined proximity to the principal party when the real-time vehicle location breaches a virtual geofence.

\* \* \* \* \*